Feb. 18, 1964   J. E. STONE   3,121,418
FEED TROUGH
Filed May 11, 1961
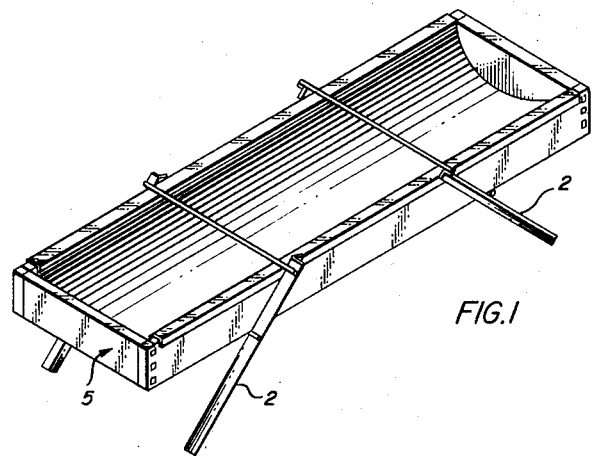
FIG.1
FIG.2
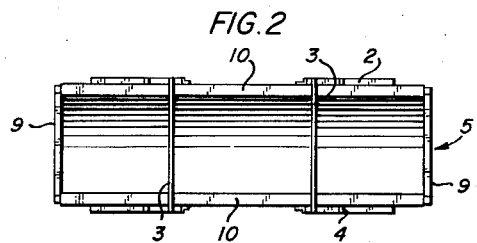
FIG.4
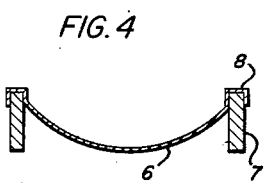
FIG.3
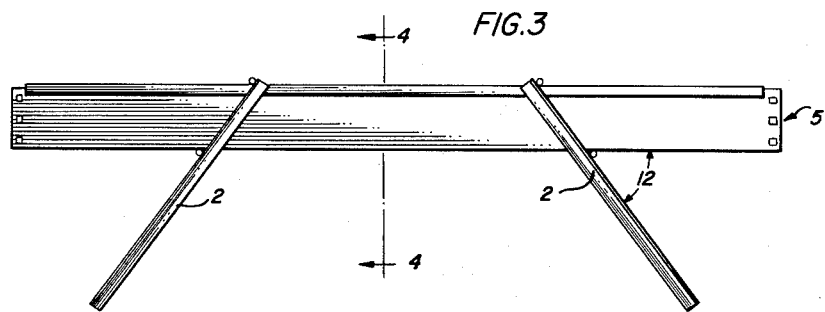
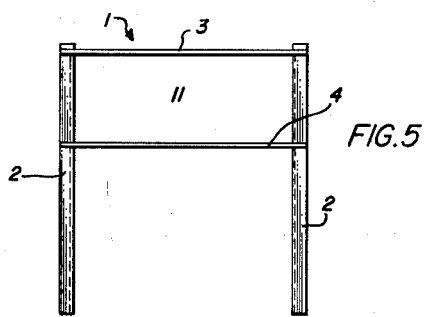
FIG.5
INVENTOR
JIM E. STONE
BY R B Coleman, Jr.
ATTORNEY

3,121,418
FEED TROUGH
Jim E. Stone, P.O. Box 1237, Ada, Okla.
Filed May 11, 1961, Ser. No. 109,441
1 Claim. (Cl. 119—61)

This invention relates to animal feeding troughs. In one aspect, this invention relates to an animal feed trough which is readily knocked down and assembled.

Many animal troughs have been proposed. Some are designed for easy assembly, others for sturdiness, still others for durability, etc. However, no one animal trough has provided all of these advantages and others. Many animal troughs are sold through mail order houses and it is desirable to provide a trough which is sold knocked down but can be readily assembled by the purchaser. While such troughs are sold, repeated disassembling and reassembling weakens the entire structure. Where these troughs are used out of doors, rain collects in the troughs causing a problem. In many troughs of the prior, art metal screws and the like are required for assembly. In still other troughs the weight of the feed tends to pull the trough body apart.

It is an object of this invention to provide an animal feeding trough which is readily assembled and reduces the above objections to a minimum.

It is another object of this invention to provide a trough wherein the weight of the feed helps to hold the trough together.

It is still another object of this invention to provide an animal feed trough which does not hold water.

Another object of this invention is to provide an animal feed trough which is readily assembled or knocked down for moving without the aid of tools.

Many other objects, features and advantages of this invention will be obvious to those skilled in the art having been given this disclosure.

According to one embodiment of this invention, a feed trough is supported by means of a pair of support frames, each comprising in combination a pair of spaced elongated members or legs being joined near an upper end by means of a substantially horizontally disposed cross-member and being joined at a lower level by a second horizontally disposed cross-member substantially parallel to first said horizontally disposed cross-member, said trough being inserted between the horizontally disposed members to rest on the lower such member.

In another embodiment of this invention a feed trough is provided by means of a substantially rectangular frame in combination with an elongated semi-cylindrical body, said body having the upper ends cupped to fit snugly over said frames and said body ends fitting adjacent the ends of said frame.

The advantage of the support means for the trough is the relative ease of setting up and knocking down the assembly without aid of any tools.

That is, the trough is set up by merely inserting the frame into the opening defined by the four members of the support.

The advantages of the trough structure are that this arrangement pulls the form together on loading, thus removing stress on the fasteners and also the additional advantage that although the assembly will hold grain, etc. water will drain out.

The rounded body member eliminates corners, facilitating cleaning and eliminating crevices wherein grain, etc. can collect and harbor harmful bacteria and/or germs.

These and other advantages will become more obvious upon examination and understanding of the drawing of which:

FIGURE 1 is a perspective view of the trough.

FIGURE 2 is a top plan view of the trough.

FIGURE 3 is a plan view of the trough.

FIGURE 4 is a cross-sectional view showing the means of supporting the body member on the frame, and FIGURE 5 is a plan view of one support.

Referring now to the drawings a pair of supports 1, comprising legs 2, an upper cross-piece 3, and a lower cross-piece 4, support trough 5 by inserting the trough 5 through the rectangular areas 11 defined by these four members.

The trough comprises in combination a substantially rectangular frame 7, and a semi-cylindrical body or section 6. This cylindrical body has the edges cupped 8, to fit snugly over the frame 7. The length of the body 6, is such to fit snugly in the length of the frame 7.

The supports can be of any material of construction which will support the designed weight. Preferably these supports will be of metal construction. The cross-pieces can be attached to the legs by any convenient means known to the art adapted to the particular material. With metal supports, welding is preferred, however, bolting or other means can be employed.

The cross-members of these supports are spaced sufficiently apart to provide desired angle 12. It is within the scope of the art to mount cross-members 4 by means of bolt and nuts to legs 2, so that the angle 12 can be adjusted by changing the position of members 4 on legs 2. For example by use of a slit in legs 2 and bolts and using nuts through members 4, make a readily adjustable support. It is also known in the art to use telescopic members or legs for adjusting the height of the trough above the ground. The angle 12 can vary over a wide range but will most frequently be between 20 and 90 degrees, preferably between 30 and 60 degrees. The angle helps anchor the trough between the supports.

The frame also can be of any desired material of construction. The frame can be assembled by any suitable means such as the use of nails, screws, braces, welding or the like or by notching the end and side members to fit together. The end members 9 should be so arranged to fit between the side members 10, so that the weight of the body 6 will hold the entire assembly together. The depth of the frame is sufficient to completely close off the end of the body. Where desired, it is within the scope of the invention to shape the end piece to conform with the curvature of the body so that the entire frame depth need not be the same.

In one specific embodiment a 96" long by 29" wide trough was assembled. The trough frame was of 2 x 8 dressed redwood held together by means of three 3/8 x 4 lag screws through each of the 96" redwood sections near each end and into the end of the end redwood sections. The body was of 26 gauge galvanized iron. The legs or supports were 1½" x ⅛" angle iron and the cross-members were ½" iron rods. The angle iron legs were 33 inches long and the cross-members were on 11⅜" centers. The angle 12 of the assembled trough was 50°. The entire assembly weighed only 85 pounds but supported 2,000 pounds of concrete blocks loaded thereon.

This invention has been described in a preferred embodiment, however, those skilled in the art will see many modifications, which can be made without departing from the scope thereof. For example by water sealing the body member to the frame member at the ends such as by caulking or even closing the metal ends, the trough could be used as a watering trough. An automatic valve could be installed to facilitate filling the trough. A hay rack can be installed on the trough either by designing its support to fit over the frame edges or by fastening to the leg members.

I claim:

An animal feed trough comprising a substantially rectangular frame when viewed in plan and having side and end portions, an elongated feed section having means to engage the side portions to support the feed section in the frame, and a pair of supports with each support consisting of two substantially parallel legs interconnected at a top end of each leg by an upper crosspiece and a second crosspiece secured to the legs below and spaced from the upper crosspiece with both crosspieces secured on the same side of its parallel legs to form therewith a rectangular area which is larger than the depth of the frame, said rectangular frame being supported in the rectangular area of the supports by the side portions of the frame resting on the second-mentioned crosspieces with the two upper crosspieces in contact with the upper edge of the side portions of the rectangular frame and said upper crosspieces subdividing the feed section into three areas as viewed in plan, and the supports when the rectangular frame is mounted therein, projecting downwardly at an angle relative to the vertical and are removable from the rectangular frame.

References Cited in the file of this patent

UNITED STATES PATENTS

| | | |
|---|---|---|
| 1,243,689 | Berry | Oct. 23, 1917 |
| 1,687,820 | Acker | Oct. 16, 1928 |
| 2,524,135 | Pittenger et al. | Oct. 3, 1950 |